United States Patent [19]

Kaneko et al.

[11] Patent Number: 5,065,528

[45] Date of Patent: Nov. 19, 1991

[54] DRYING APPARATUS UTILIZING SOLAR HEAT

[75] Inventors: Aijiro Kaneko; Masayuki Domon, both of Hanyu, Japan

[73] Assignee: Kaneko Agricultural Machinery Co., Ltd., Haryu, Japan

[21] Appl. No.: 563,383

[22] Filed: Aug. 7, 1990

[30] Foreign Application Priority Data

Aug. 8, 1989 [JP] Japan ............... 1-93297[U]

[51] Int. Cl.⁵ .............................................. F26B 19/00
[52] U.S. Cl. .......................................... 34/93; 34/181; 34/236
[58] Field of Search ............... 34/93, 236, 218, 187, 34/188, 184, 181; 203/DIG. 1; 126/417, 450

[56] References Cited

U.S. PATENT DOCUMENTS

| | | | |
|---|---|---|---|
| 417,488 | 12/1889 | Johnson et al. | 34/181 |
| 2,279,848 | 4/1942 | Unger, Jr. | 34/93 |
| 3,894,345 | 7/1975 | Zeltmann | 34/93 |
| 4,249,317 | 2/1981 | Murdock | 34/93 |

Primary Examiner—James C. Yeung
Attorney, Agent, or Firm—Armstrong, Nikaido, Marmelstein, Kubovcik & Murray

[57] ABSTRACT

An energy-saving type solar-heated drying apparatus for drying various types of matter, which utilizes a drying room surrounded by a solar-heat transmitting-/absorbing wall. In the drying room, the matter is deposited on an elongated drying cage while exposed to a dry hot air produced by the solar heat. During drying treatment of the matter, the matter is moved from a supply side of the drying cage to a discharge side of the same in a longitudinal direction of the drying cage by means of a stirring/mixing transporter by which the matter is stirred/mixed while moved from the supply side to the discharge side of the drying cage. The dry hot air produced in the drying room under the influence of the solar heat is drawn into the drying cage, passing through the matter deposited thereon so as to evenly and effectively dry the matter.

4 Claims, 6 Drawing Sheets

DRYING APPARATUS UTILIZING SOLAR HEAT

BACKGROUND OF THE INVENTION

1. Field of the Invention

The present invention relates to an energy-saving drying apparatus which utilizes solar heat to effectively dry a large amount of matter to be dried, the matter being supplied to a drying room of the apparatus and dried therein through the use of solar heat.

2. Description of the Prior Art

It is conventionally known to construct a drying apparatus from a plurality of rooms which are sequentially arranged in a specified order.

An example of such a sequential arrangement is as follows; a matter-receiving room in which are disposed matter-receiving hoppers, roughers, weighing machines and like machines; a drying room in which a plurality of recycling-type drying machines are disposed in parallel with each other; and a weighing/packing room in which a weighing/packing machine is disposed. The matter having been received in a conventional drying apparatus of this type is dried in the drying room through the use of the recycling-type drying machines to have a predetermined water content, and then weighed and packed in the weighing/packing room of the apparatus to be formed into the final product.

However, a conventional drying apparatus as described above employs dry hot air (which is produced by combustion of liquid fuels) as its heat source for drying the matter to be dried. The matter to be dried is exposed to blasts of such dry hot air and dried to have a predetermined water content. Consequently, when a large amount of the matter must be dried by the use of the conventional drying apparatus, a large amount of liquid fuels are required, and, therefore, this conventional drying apparatus is disadvantageous due to the fuel expense.

SUMMARY OF THE INVENTION

It is an object of the present invention to resolve the above problem inherent in the conventional drying apparatus by providing an energy-saving drying apparatus which utilizes solar heat to evenly and effectively dry a large amount of matter to be dried, the matter being supplied to a drying room of the apparatus and dried therein by the use of solar heat. The drying room is surrounded by a solar-heat transmitting/absorbing wall made of a suitable material such as fiber-glass reinforced plastic or equivalent material to permit a temperature of the drying room to increase, so that a dry hot air is produced in the drying room. The matter having been received in the drying room is exposed to such dry hot air while stirred, mixed and transported by a self-propelling stirring/mixing transporter from a supply side of the drying room to a discharge side of the same so as to evenly and effectively dry the matter.

In accordance with a first aspect of the present invention, the above object of the present invention is accomplished by a solar-heat utilizing drying apparatus, comprising:

a drying room;

a solar heat transmitting/absorbing material surrounding the drying room;

an elongated drying cage which is disposed in the drying room having an opened upper side;

a horizontal ventilating panel disposed in the drying room dividing the drying room into an upper portion and a lower portion, the upper portion being formed into a drying portion and the lower portion being formed into an air-exhaust portion;

a self-propelled stirring/mixing transporter means which is movably mounted on the elongated drying cage to be movable in a vertical direction and in a longitudinal direction of the elongated drying cage, for stirring, mixing, and transporting matter having been received in the drying room from a supply side of the drying room to a discharge side of the drying room; and a plurality of air-exhaust ports formed in a side surface of the air-exhaust portion of the drying room at predetermined intervals, and a plurality of air exhaust units respectively connecting the air exhaust ports.

In accordance with a second aspect of the present invention, the above object of the present invention is accomplished by a solar-heat utilizing drying apparatus as set forth above, wherein:

the self-propelled stirring/mixing transporter means is provided with rotary stirring/mixing levers;

the elongated drying cage has a supply-side bottom portion and a discharge-side bottom portion which are each formed into a curved bottom portion extending along a circular arc which is parallel with but spaced apart from a path of the rotary stirring/mixing levers of the self-propelled stirring/mixing transporter means; and the discharge-side bottom portion forming the curved bottom portion of the elongated drying cage is provided with a support axle and is swingably mounted thereon so as to open and close a bottom of the elongated drying cage at the discharge-side bottom portion.

In accordance with a third aspect of the present invention, the above object of the present invention is accomplished by a solar-heat utilizing drying apparatus as set forth in the first or second aspect of the present invention, wherein:

each of a free-end portion of the rotary stirring/mixing levers of the self-propelled stirring/mixing transporter means is formed into a paddle-shaped portion having a radial front end in which a buffer means such as brushes and the like is provided, the paddle-shaped portion of each of the rotary stirring/mixing levers being provided with a pair of upright side plates oppositely disposed from each other.

In accordance with a fourth aspect of the present invention, the above object of the present invention is accomplished by a solar-heat utilizing drying apparatus as set forth in anyone of the first, second and the third aspects of the present invention, further including:

a matter-receiving room in the supply side of the drying room, in which matter-receiving room pre-treatment units such as matter-receiving hoppers, weighing machines and equivalents for pre-treating the matter are disposed; and a finishing room in the discharge side of the drying room, in which finishing room finishing means such as weighting/packing machines and equivalents are disposed, the matter-receiving room being in contact with the finishing room in the drying room to realize a continuous drying and finishing treatment of the matter.

In drying apparatus of the present invention utilizing solar heat as discussed above, the drying room in which the elongated drying cage is disposed is surrounded by the solar-heat transmitting/absorbing wall, to make it possible to increase a temperature of the drying room by effectively utilizing the solar heat so that effective dry hot air is easily produced in the dry room in an energy-saving manner, whereby the matter supplied to the elongated drying cage is effectively dried. In addition, the matter having been supplied to the drying cage in a stationary state is then stirred and mixed by the stirring/mixing transporter means when the transporter travels on the drying cage in a reciprocal manner along its longitudinal direction so that the matter is efficiently dried by a synergetic effect of the dry hot air (produced by the use of the solar heat) and the stirring/mixing operation (of the transporter). Due to this synergetic effect, the matter to be dried is surely, effectively and evenly dried.

The present drying apparatus is easily operable and thermally adjustable for particular applications, and requires minimal manual labor.

Since fuels such as kerosene are not used as a heat source, the dried matter is not impregnated with any noxious fumes or odors and thus a high taste quality can be maintained for food products.

Some examples of matter which can be suitably dried in this drying apparatus are grains, teas, coffee beans, herbs, grasses, sawdust, seaweeds, fishes, shrimps, rice hulls and similar products which may require a drying process.

DESCRIPTION OF THE PREFERRED EMBODIMENTS

Figure 1:
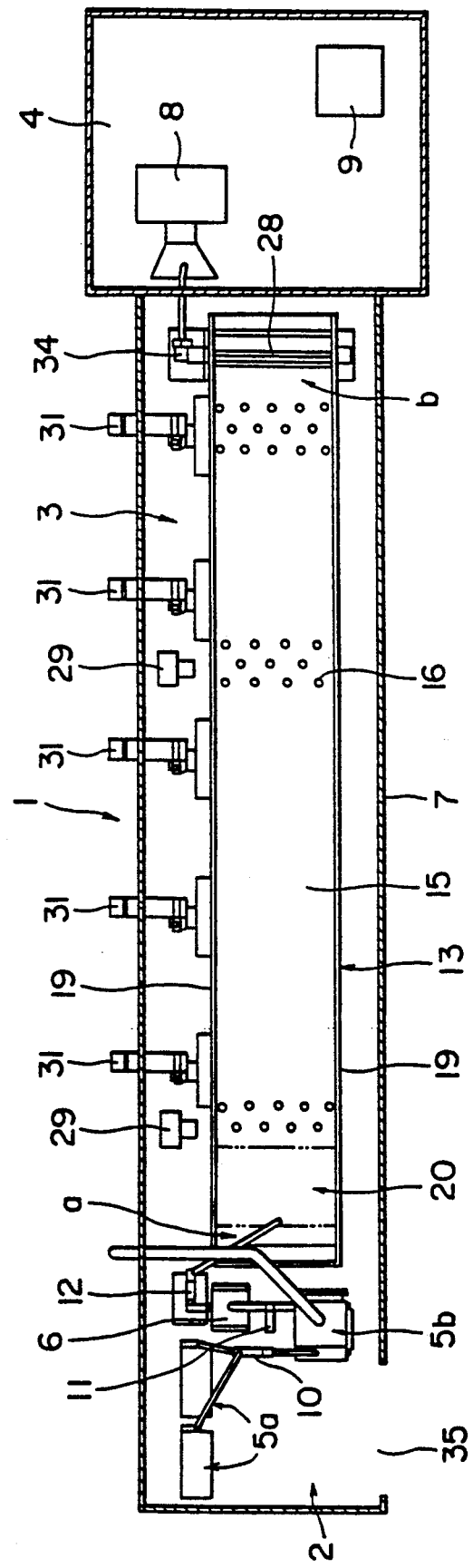
FIG. 1 is a plan view of a drying/finishing installation employing the drying apparatus of the present invention utilizing the solar heat.

Below is a detailed description of an embodiment of the present invention which will be described in detail with reference to the accompanying drawings.

In FIGS. 1 to 4, the reference numeral 1 denotes a drying installation employing a drying apparatus of the present invention, in which matter to be dried is received, dried and packed so as to be formed into a product. The drying installation 1 is constructed of the following rooms (arranged in the following order): a matter-receiving room 2 in which are disposed a plurality of matter-receiving hoppers 5a, a rougher 5b, a weighing machine 6 and similar machines; a drying room 3; and a finishing room 4 in which a dried-matter packing machine 9 is disposed.

Figure 6:
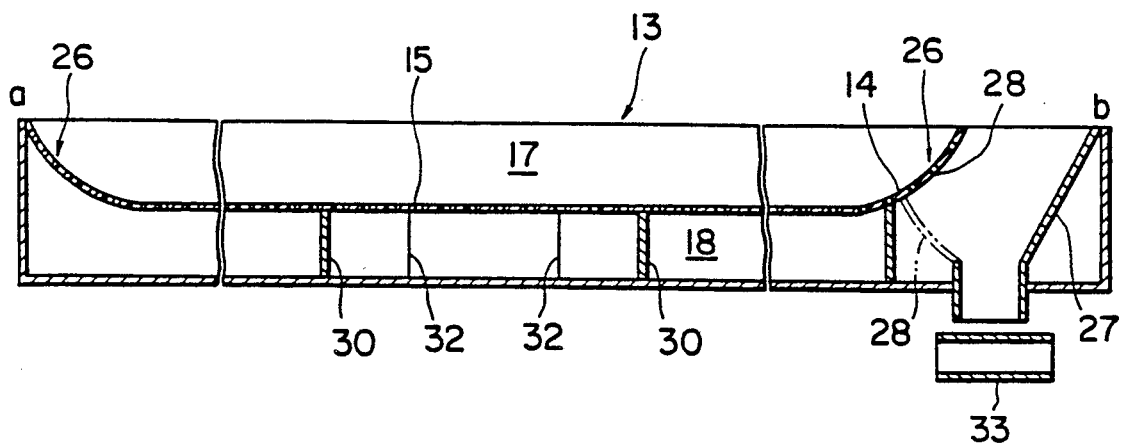
FIG. 6 is a longitudinal sectional view of the drying cage of the drying apparatus of the present invention.

In the matter-receiving room 2, the rougher 5b is connected with each of the matter-receiving hoppers 5a through a transshipping elevator 10, while also connected with weighing machines 6 through a weighing elevator 11. Weighing machine 6 is communicated with a supply side of an elongated drying cage 13 through a feed elevator 12. The elongated drying cage 13 is disposed in the drying room 3 as shown in FIG. 1, while divided by a horizontal ventilation panel 15 into an upper portion forming a drying portion 17 which has its upper side opened, and lower portion forming an airexhaust portion 18. The horizontal ventilation panel 15 is provided with a plurality of ventilation holes 16 formed therein, while formed into a curved bottom portion 26 in each of its supply-side bottom portion and discharge-side bottom portion as shown in FIG. 6 to prevent the matter being dried from piling up.

Figure 5:
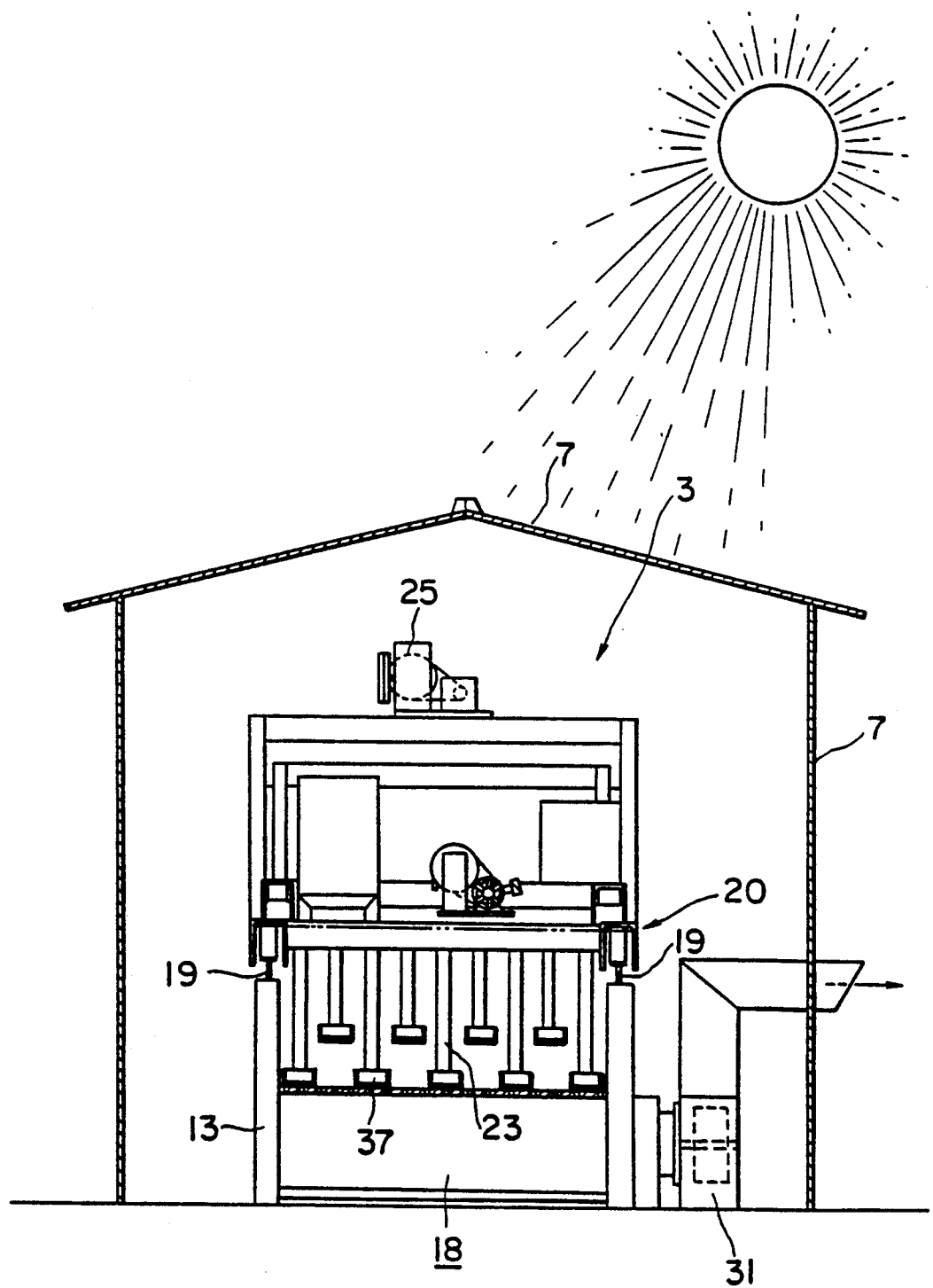
FIG. 5 is a cross-sectional view of the drying installation shown in FIG. 2, taken along the line A—A' of FIG. 2.
Figure 8:
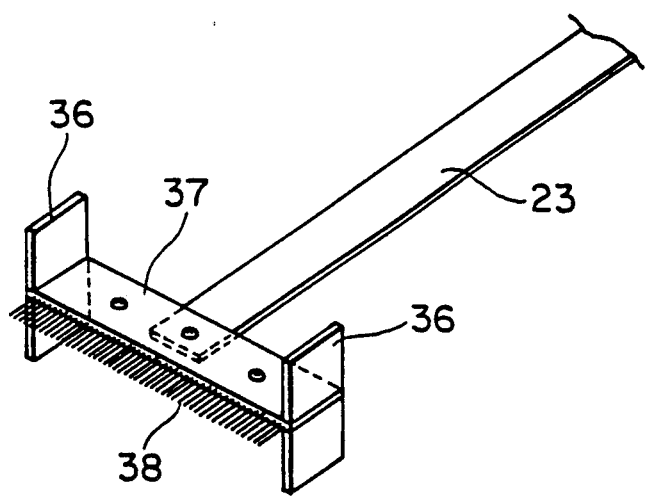
FIG. 8 is a perspective view of the rotary stirring/mixing lever employed in the stirring/mixing transporter of the drying apparatus of the present invention.

As shown in FIG. 5, a pair of rails 19 are fixedly mounted on opposite sides of the drying cage 13. On the rails are movably mounted a stirring/mixing transporter 20 so as to travel along the longitudinal direction of the drying cage in a reciprocating manner. The transporter 20 is constructed of: a chassis 21; and a rotary member provided with a rotary shaft 22 and a plurality of radially arranged stirring/mixing levers 23 supported by the rotary shaft 22. As shown in FIG. 8, each of the levers 22 of the above rotary member is formed into a paddle-shaped member 37 having a free-end portion which is provided with a pair of upright side plates which are oppositely disposed from each other. A buffer member 38 consisting of brushes or a similar material is implanted in a radially outward end of the paddle-shaped member 37. Rotary shaft 22 of the rotary member of the stirring/mixing transporter 20 is vertically moved by elevating motor 25 as often as necessary. Elevating motor 25 (shown in FIG. 5) is fixedly mounted on chassis 21 of transporter 20.

Figure 7:
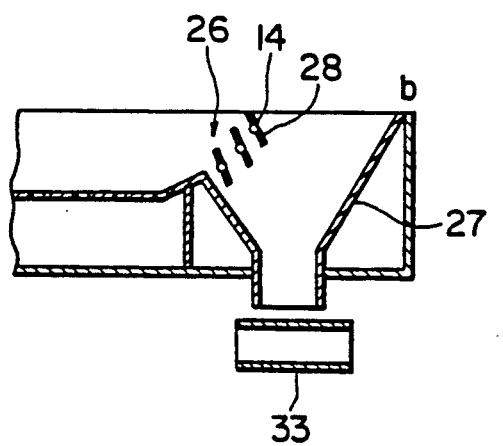
FIG. 7 is a partially enlarged longitudinal view of the drying cage shown in FIG. 6, illustrating the discharge-side portion thereof.

In the drying apparatus of the present invention having the above construction, the matter to be dried is first deposited on the drying portion 17 transporter 20 in a stationary condition, and then stirred and mixed by transporter 20 as part of the drying operation. In this drying operation, the transporter 20 has the stirring/mixing levers 23 thereof rotated clockwise or counter clockwise, while moved in the longitudinal direction of the drying cage 13. When it is required to discharge the matter from discharging shutter 28 to a discharge hopper 27, the transporter 20 rotates the stirring/mixing levers 23 clockwise when the transporter 20 moves from the supply side "a" of the drying cage 13 to the discharge side "b" of the same. As shown in FIG. 6, discharging shutter 28 is formed in the curved bottom portion 26 of the discharge side "b" of horizontal ventilation panel 15. After discharging, the stirring/mixing levers 23 are lifted so as to be separated from the matter deposited on the horizontal ventilation panel 15, and then moved back to the supply side "a" of the drying cage 13. Then, the transporter 20 moves the stirring/mixing levers 23 downward to be brought into contact with the matter deposited on the horizontal ventilation panel 15, so that the same cycle is repeated to discharge the matter into the discharge hopper 27. As shown in FIG. 6, the discharge shutter 28 formed in the curved bottom portion 26 of the drying cage 13 is so operated as to open/close the discharge port formed in the discharge side "b" of the horizontal ventilation panel 15. In addition, as shown in FIGS. 6 and 7, it is also possible to provide a plurality of the discharge shutters 28 in the curved bottom portion 26 of the drying cage, which shutters 28 may be supported by a common support shaft 14 so that the shutters 28 are opened/closed in a synchronized fashion.

In FIG. 1, reference numeral 29 denotes a heat source disposed in the drying room 3 of the drying apparatus of the present invention, and is used during periods in which solar heat is not available, such as at night or in cloudy weather.

In the drying apparatus of the present invention, as shown in FIG. 6, the air-exhaust portion 18 of the drying cage 13 is divided by partitions 30 into a plurality of compartments. In the embodiment of the present invention shown in FIG. 6, the number of the compartments is five. Each of the compartments of the air-exhaust portion 18 is provided with a ventilation unit 31 having an intake port which is communicated with the compartment, and an exhaust port which opens into the atmosphere. When ventilation units 31 are operated, the dry hot air produced by the solar heat or the heat source 29 is introduced into the airexhaust portion 18 of the drying cage 13 after passing through the matter to be dried which is located in the drying portion 17 of the drying cage 13, so that the matter to be dried is effectively dried by the dry hot air in the drying apparatus of the present invention.

Figure 2:
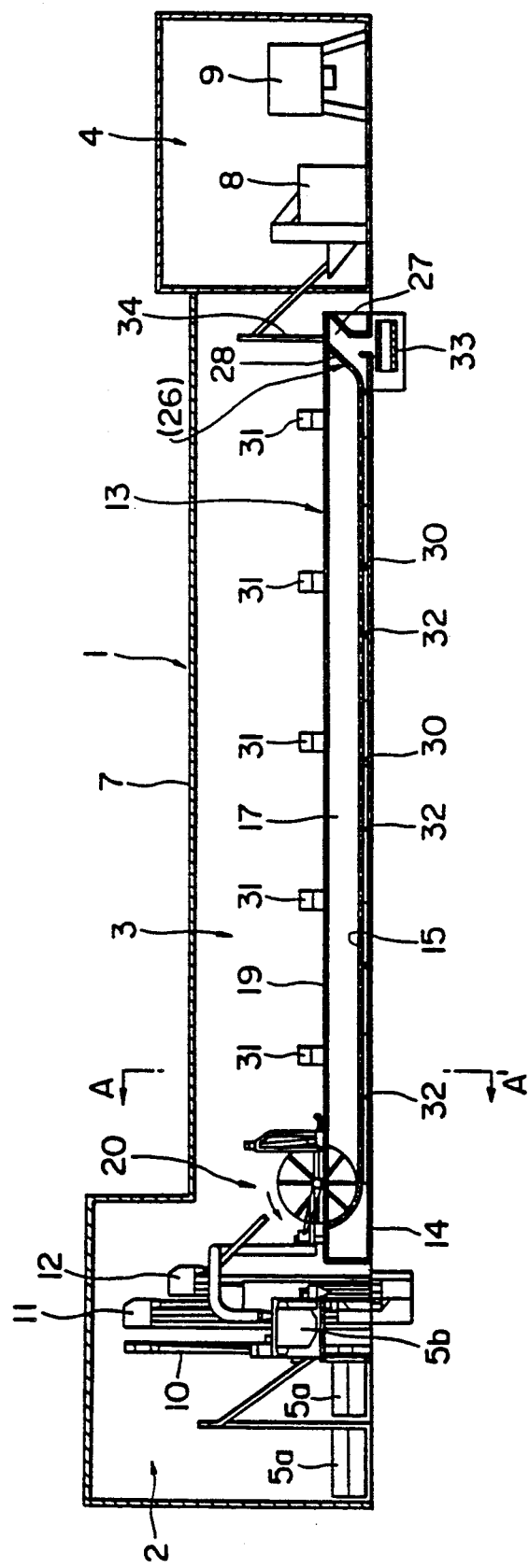
FIG. 2 is a side view of the installation shown in FIG. 1, illustrating the essential parts of the installation.
Figure 3:
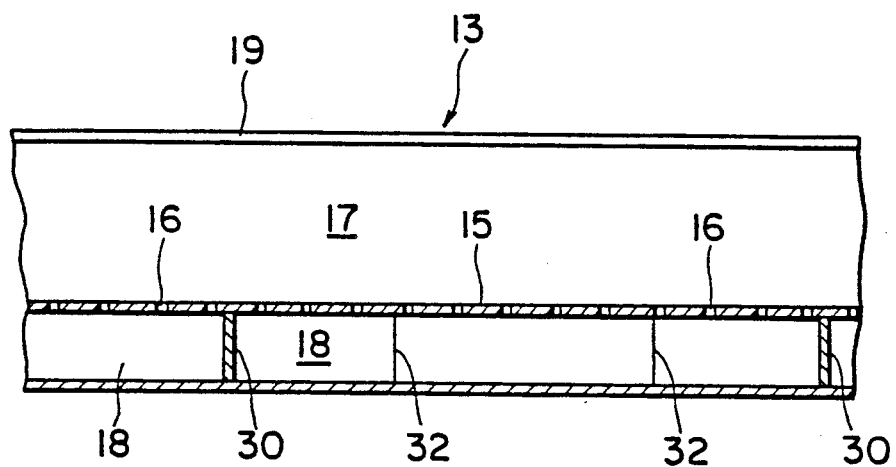
FIG. 3 is a partially broken enlarged longitudinal sectional view of the drying cage of the drying apparatus of the installation shown in FIG. 1, illustrating the essential parts thereof.
Figure 4:
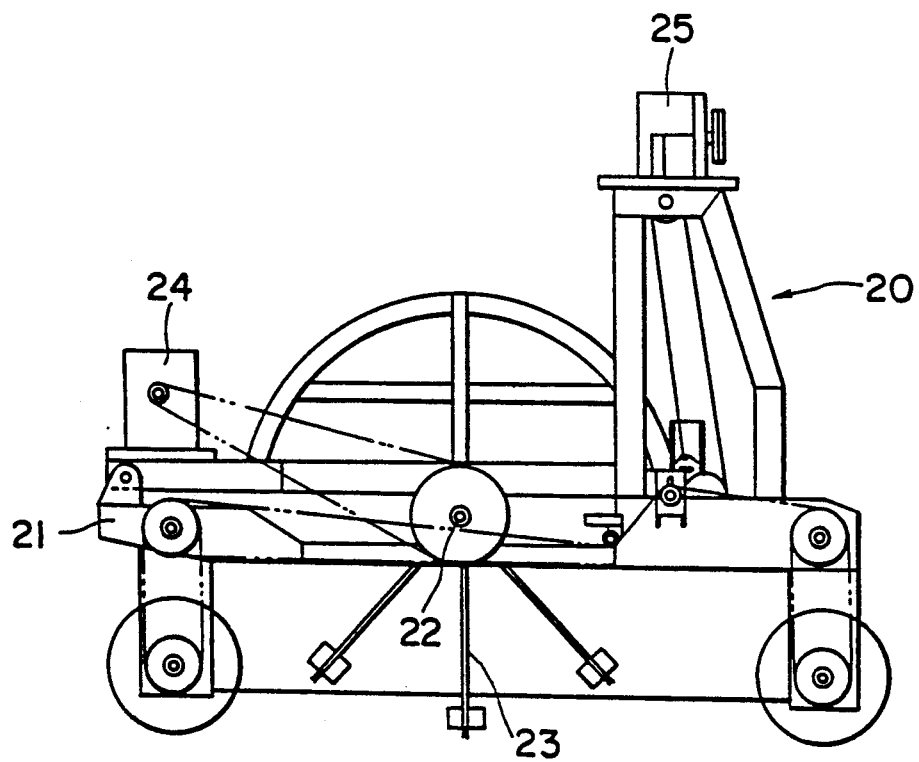
FIG. 4 is an enlarged side view of the stirring/mixing transporter means employed in the drying apparatus of the present invention.

In FIG. 6, reference numeral 33 denotes a belt conveyer from which the product or dried matter is supplied to a tank 8 through an elevator 34 interposed therebetween as shown in FIG. 1 and 2.

Reference numeral 35 shown in FIG. 1 denotes an entrance to drying installation 1.

In the drying installation 1 employing the above embodiment of the drying apparatus of the present invention utilizing the solar heat, the matter to be dried is supplied to the matter-receiving hoppers 5a, and then supplied therefrom to the rougher 5b so as to be subjected to a roughing treatment therein. The roughed matter is then supplied to weighing machine 6 from which the matter enters the supply side "a" of the drying cage 13 disposed in the drying room 3. Since drying room 3 is surrounded by the solar-heat transmitting/absorbing wall 7, air in the drying room 3 is heated to a considerably high temperature to become dry hot air. Under such circumstances, both stirring/mixing transporter 20 and the air-exhaust units 31 begin to operate, so that the matter continuously supplied to the drying cage 13 is stirred/mixed and dried as the transporter 20 travels in the longitudinal direction of the drying cage 13. Through such stirring/mixing operation of the transporter 20, the matter to be dried is gradually moved from the supply side "a" of the drying cage 13 to the discharge side "b" of the same while sufficiently dried under the action of the dry hot air which is sucked downward by the air-exhaust units 31 into the air-exhaust portion 18 of the drying cage 13, whereby the thus dried matter is discharged from the discharge side "b" of the drying cage 13 of the drying apparatus of the present invention. Then, the thus discharged matter enters the tank 8 disposed in the finishing room 4 in which the dried matter is weighed and packed to be formed into a product.

What is claimed is:

1. A solar-heat utilizing drying apparatus, comprising:

a drying room;

a solar heat transmitting/absorbing material surrounding said drying room;

an elongated drying cage which is disposed in said drying room having an opened upper side;

a horizontal ventilating panel disposed in said drying room dividing said drying room into an upper portion and a lower portion, said upper portion being formed into a drying portion and said lower portion being formed into an air-exhaust portion;

A self-propelled stirring/mixing transporter means movably mounted on said elongated drying cage to be movable in a vertical direction and in a longitudinal direction of said elongated drying cage, for stirring, mixing, and transporting matter having been received in said drying room from a supply side of said drying room to a discharge side of said drying room;

a plurality of air-exhaust ports formed in a side surface of said air-exhaust portion of said drying room at predetermined intervals; and a plurality of air exhaust units respectively connecting said air exhaust ports.

2. A solar-heat utilizing drying apparatus as set forth in claim 1, wherein:

said self-propelled stirring/mixing transporter means includes rotary stirring/mixing levers;

said elongated drying cage has a supply-side bottom portion and a discharge-side bottom portion which are each formed into a curved bottom portion extending along a circular arc which is parallel with but spaced apart from a path of said rotary stirring/mixing levers of said self-propelled stirring/mixing transporter means; and said discharge-side bottom portion forming said curved bottom portion of said elongated drying cage is provided with a support axle and is swingably mounted thereon so as to open and close a bottom of said elongated drying cage at said dischargeside bottom portion.

3. The solar-heat utilizing drying apparatus as set forth in claim 2, wherein:

each of a free-end portion of said rotary stirring/mixing levers of said self-propelled stirring/mixing transporter means is formed into a paddle-shaped portion having a radial front end and a buffer means mounted thereon, said paddle-shaped portion of each of said rotary stirring/mixing levers further including a pair of upright side plates oppositely disposed from each other for improving a stirring/mixing effect of said transporter.

4. The solar-heat utilizing drying apparatus as set forth in anyone of claim 1, 2, or 3, further including:

a matter-receiving room in said supply side of said drying room, said matter-receiving room having pre-treatment units including matter-receiving hoppers, and weighing machines for pre-treating said matter; and a finishing room in said discharge side of said drying room, said finishing room having finishing units including weighing/packing machines, said matter-receiving room being in contact with said finishing room in said drying room to realize a continuous drying and finishing treatment of said matter.

* * * * *

UNITED STATES PATENT AND TRADEMARK OFFICE
CERTIFICATE OF CORRECTION

PATENT NO. : 5,065,528
DATED : November 19, 1991
INVENTOR(S) : KANEKO et al

It is certified that error appears in the above-identified patent and that said Letters Patent is hereby corrected as shown below:

On the cover page, item [73], please change "Haryu" to --Hanyu--.

Signed and Sealed this

Sixth Day of July, 1993

Attest:

MICHAEL K. KIRK

Attesting Officer

Acting Commissioner of Patents and Trademarks